United States Patent [19]

Obadal

[11] Patent Number: 4,460,168

[45] Date of Patent: Jul. 17, 1984

[54] RESILIENT MOUNT FOR SUPPORTING A CAB STRUCTURE ON THE CHASSIS OF A VEHICLE

[75] Inventor: Richard D. Obadal, Cedar Falls, Iowa

[73] Assignee: Deere & Company, Moline, Ill.

[21] Appl. No.: 399,636

[22] Filed: Jul. 19, 1982

[51] Int. Cl.³ .............................................. F16F 9/14
[52] U.S. Cl. .................................. 267/140.1; 267/8 R
[58] Field of Search ..................... 180/89.12; 248/562; 267/8 R, 22 R, 140.1, 141.1

[56] References Cited

U.S. PATENT DOCUMENTS

| | | | |
|---|---|---|---|
| 2,502,322 | 3/1950 | Iredell | 267/140.1 |
| 3,888,449 | 6/1975 | Jablonski et al. | 267/140.1 |
| 4,186,930 | 2/1980 | Shulke | 277/166 |
| 4,265,328 | 5/1981 | Rowa et al. | 180/89.13 |
| 4,271,921 | 6/1981 | Ochsner | 180/89.12 |

OTHER PUBLICATIONS

Automotive Engineering Article, vol. 89, No. 8, Aug. 1981, pp. 91 and 92.

Primary Examiner—Duane A. Reger

[57] ABSTRACT

A resilient mount is disclosed for supporting a cab structure on the chassis of a vehicle. The mount includes a cup-shaped housing which is attached to the chassis such that it can hold a quantity of fluid. A stem which is attached at one end to the cab structure projects through the top of the housing and engages with a fitting which is completely retained in the housing. A pair of flexible members are tightly fitted into the housing above and below the fitting and cooperate to form a fluid cavity therebetween. The top flexible member has an opening therein through which the stem passes while the bottom flexible member contains at least one fluid passage which permits fluid flow therethrough as the size of the passage varies due to the flexing of the bottom flexible member. The mount also includes a valve for regulating fluid flow between the cavity and the fluid passage as the stem moves in and out or laterally relative to the housing. This mount provides both hydraulic and resilient damping of the cab structure relative to the chassis.

22 Claims, 7 Drawing Figures

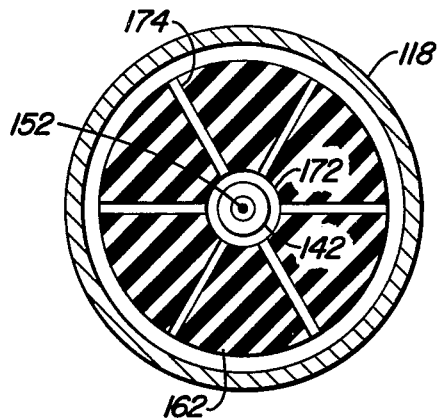
FIG. 7
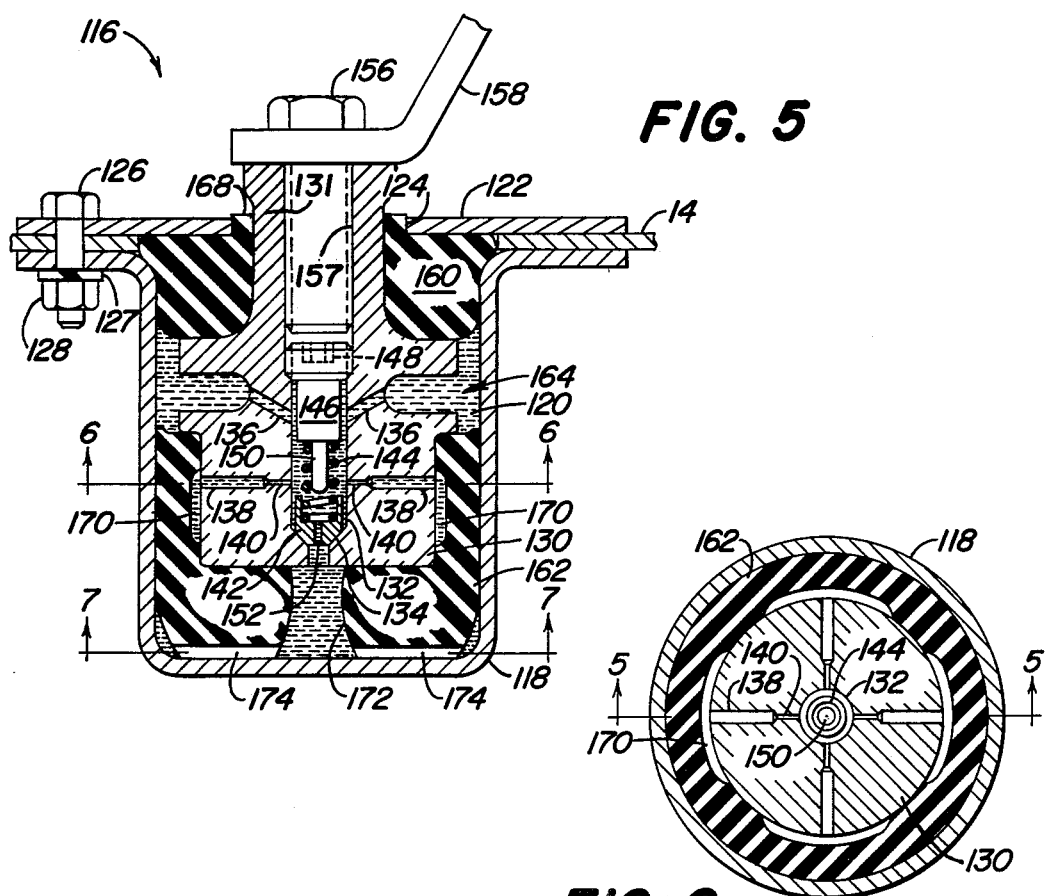
FIG. 5
FIG. 6

RESILIENT MOUNT FOR SUPPORTING A CAB STRUCTURE ON THE CHASSIS OF A VEHICLE

FIELD OF THE INVENTION

This invention relates to a resilient mount for supporting a cab structure on the chassis of a vehicle and more particularly to a hydraulically damped rubber mount for supporting a cab structure on the chassis of a tractor.

BACKGROUND OF THE INVENTION

Enclosed cabs have been provided on modern farm tractors to reduce noise, vibration and objectionable atmospheric conditions. The use of resilient mounts to isolate the cab from vibration in the tractor chassis is common. Several types of resilient mounts are described in the following U.S. Pat. Nos. 4,271,921 issued to Ochsner in 1981; 4,265,328 issued to Rowa et al in 1981 and 4,186,930 issued to Shulki in 1980. However, the use of these types of mounts has not satisfactorily attenuated low frequency vibration in the 4–8 Hertz range.

One recent attempt to do so has been publicized in Automotive Engineering, Vol. 89, Number 8, pages 91 and 92. Here, an engine mount is taught which uses the combination of a rubber housing having an enclosed orifice. Fluid contained in the housing is metered past the orifice to obtain a damping effect. This mount is structurally and, to a limited extent, functionally different from the present invention.

SUMMARY OF THE INVENTION

Briefly, this invention relates to a resilient mount for supporting a cab structure on the chassis of a vehicle. The mount includes a cup-shaped housing which is attached to the chassis such that it can hold a quantity of fluid. A stem, attached at one end to the cab structure, projects through the top of the housing and engages with a fitting which is completely retained in the housing. A pair of flexible members are tightly fitted into the housing above and below the fitting and form a fluid cavity therebetween. The top flexible member has an opening therein through which the stem passes while the bottom flexible member contains at least one fluid passage. The size of the passage will vary as the bottom flexible member is deflected by movement of the stem. The mount also includes a valve for regulating fluid flow thereacross as the stem moves in and out of the housing. The flexible members in combination with the movement of the fluid past the valve provides both lateral and vertical damping of the cab structure relative to the chassis.

The general object of this invention is to provide a resilient mount for connecting a cab structure to the chassis of a vehicle. A more specific object of this invention is to provide a hydraulically damped rubber mount for supporting a cab structure on the chassis of a tractor.

Another object of this invention is to provide a resilient mount for attenuating low frequency vibration.

Still another object of this invention is to provide a resilient mount for a vehicle which is capable of providing both lateral and vertical damping.

Other objects and advantages of the present invention will become more apparent to those skilled in the art in view of the following description and the accompanying drawings.

BRIEF DESCRIPTION OF THE DRAWINGS

FIG. 5 is a sectional view of an alternative embodiment of the resilient mount taken along the line 5—5 of FIG. 6.

FIG. 6 is a cross-sectional view taken along the line 6—6 of FIG. 5.

FIG. 7 is a cross-sectional view taken along the line 7—7 of FIG. 5.

DETAILED DESCRIPTION OF THE PREFERRED EMBODIMENTS

Figure 1:
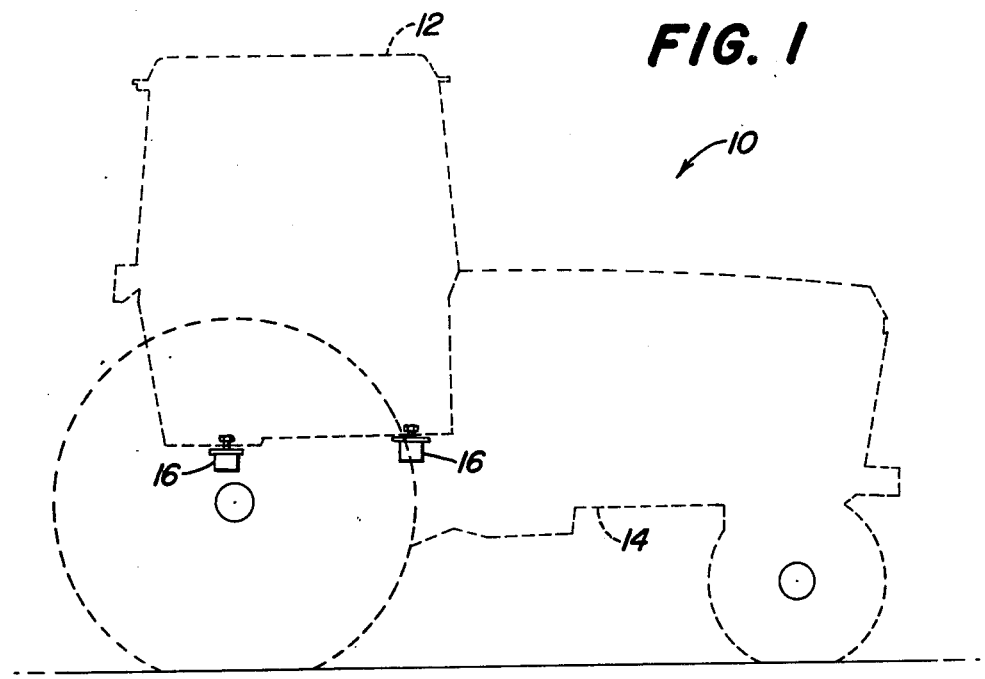
FIG. 1 is a side view of a tractor showing the resilient mounts of this invention.

Referring to FIG. 1, a tractor 10 is shown having a cab structure 12 supported on a chassis 14 by resilient mounts 16. Preferably, there are four mounts 16, each positioned approximate a lower corner of the cab structure 12.

Figure 2:
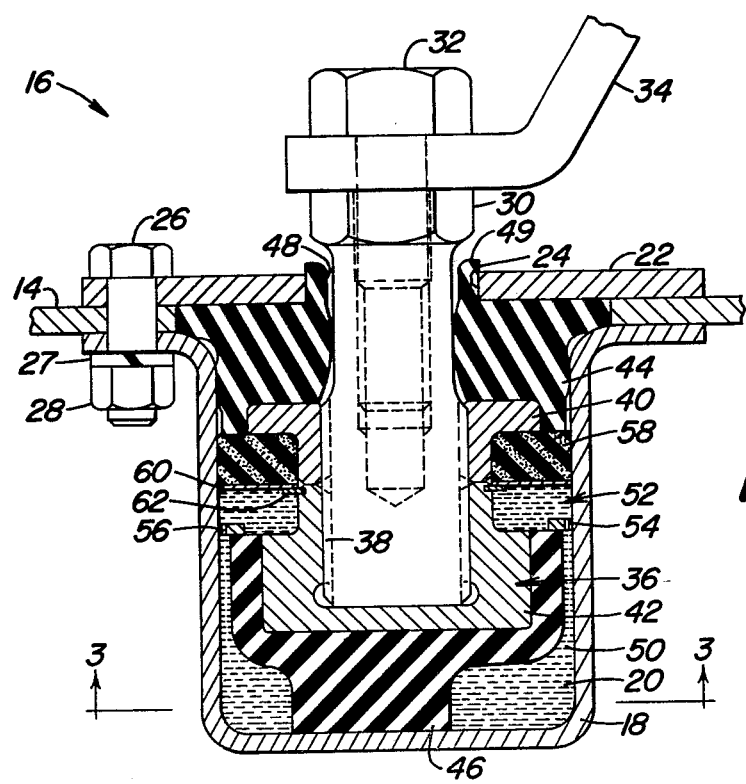
FIG. 2 is a sectional view of the resilient mount taken along the line 2—2 of FIG. 3.
Figure 3:
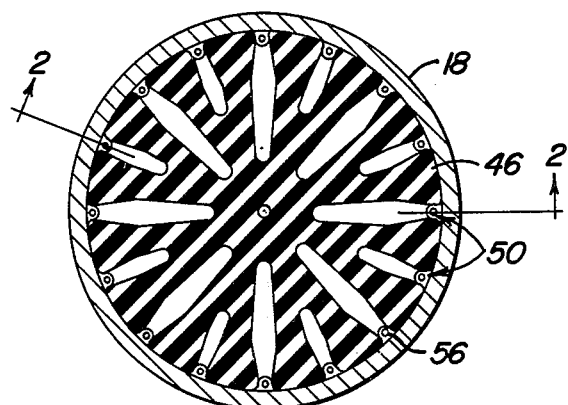
FIG. 3 is a cross-sectional view taken along the line 3—3 of FIG. 2.

Referring to FIGS. 2 and 3, each mount 16 includes a housing 18, preferably cup-shaped in configuration, which is capable of holding a quantity of fluid 20. For purposes of convenience, and not by way of limitation, the resilient mount 16 will be described as being in the upright position. The housing 18 contains a cover 22 which has an enlarged central opening 24 formed therein. The housing 18 and the cover 22 are securely attached to the chassis 14, for example, by bolts 26, washers 27 and nuts 28, one of each being shown in FIG. 2.

A stem 30 is securely attached at one end by a bolt 32 to a bracket 34 which extends outward from the cab structure 12. The opposite end of the stem 30 extends through the enlarged opening 24 in the cover 22 of the housing 18 and engages with a fitting 36. The opening 24 has to be of sufficient size to permit lateral movement of the stem 30 without contacting the cover 22. The fitting 36 is completely contained in the housing 18 and contains a threaded bore 38 into which the lower end of the stem 30 is securely received. In addition, the fitting 36, which is preferably metal, has an outer diameter which is smaller than the inner diameter of the housing 18. In order to facilitate assembly of the mount 16, it is advantageous to construct the fitting 36 such that it has an upper part 40 and a lower part 42.

The mount 16 also includes first and second flexible members, 44 and 46, which are tightly fitted into the housing 18 above and below the fitting 36. The first flexible member 44 has an opening 48 formed therein and a sleeve portion 49 which extends into the enlarged opening 24 of the cover 22. This sleeve portion 49 cushions the lateral movement of the stem 30 relative to the cover 22. The second flexible member 46 contains at least one, and preferably several, passages 50, see FIG. 3. The passages 50 are designed such that they will vary in size and shape as pressure is exerted on the flexible member 46. The exact shape and size of the passages 50 can vary depending upon the amount of damping needed.

The flexible members 44 and 46 can be constructed from any suitable resilient material, with rubber being the most acceptable. However, it should be mentioned that the fluid used as the liquid medium in the mount 16 should be compatible with such flexible material. In addition, when the first and second flexible members 44 and 46 are made of rubber, it is advantageous to bond the rubber directly to the fitting 36 to prevent leakage of fluid therebetween.

The first and second flexible members 44 and 46 are spaced apart from each other and cooperate with the fitting 36 and the inner surface of the housing 18 to form a cavity 52. This cavity 52 is located so as to be in constant fluid communication with the passages 50 formed in the second flexible member 46. Positioned within the cavity 52 is a valve 54, shown in the shape of a ring having a plurality of through orifices 56 formed therein. The orifices 56 provide an open flow path across the valve 54 at all times so that fluid in the passages 50 can flow across the valve 54 and into the cavity 52 or vice versa. Since there are a plurality of orifices 56 spaced circumferentially about the valve 54, it should be evident that several orifices will always be aligned over several of the passages 50 at all times. The outer diameter of the valve 54 may be smaller than the inner diameter of the housing 18 and this will permit some leakage across the valve 54. In addition, the size difference permits the valve 54 to freely move vertically within the cavity 52 should a pressure difference be created across it. This occurs as the flexible members 44 and 46 are deformed due to the lateral or vertical movement of the stem 30 relative to the housing 18.

Also located in the cavity 52, above the valve 54, is an air permeable member 58. This air permeable member 58 is held in place by a screen 60 which is held relative to the fitting 36 by a snap ring 62. The air permeable member 58 provides a volumetric air space and must be capable of being compressed. Materials that can be used as the air permeable member 58 include: open and closed cell foam material, such as: styrene, polystyrene, styrofoam, etc. The air permeable member 58, which may also absorb or partially absorb a liquid, functions to provide an area into which the fluid can be displaced.

When the mount 16 is assembled, the level of the fluid 20 should be even with the bottom of the air permeable member 58. This assures that there will be sufficient liquid present to assist the first and second flexible members, 44 and 46, in damping out vibration and oscillation imparted into the cab structure 12, especially low frequency vibrations in the 8-12 Hertz range.

It should be noted that even if the tractor 10 is operated on an incline, damping will be obtainable provided there is fluid 20 in the cavity 52.

Figure 4:
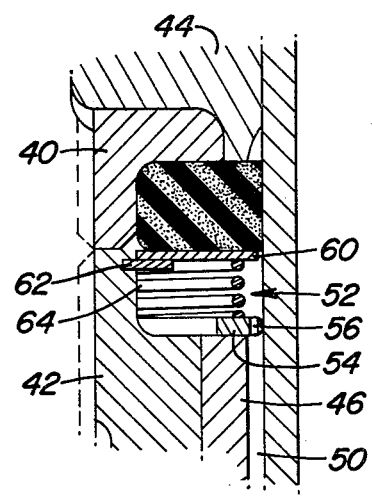
FIG. 4 is an enlarged view of the fluid cavity shown in FIG. 2 and including a spring biasing the valve downward.

Referring to FIG. 4, a spring 64 is shown positioned in the cavity 52 between the valve 54 and the screen 60. The spring 64 continuously biases the valve 54 to its downward position but is not so strong as to prevent the valve 54 from being lifted upward as the fluid pressure beneath the valve 54 reaches a predetermined value. The spring 64 also ensures that the valve 54 will not become askewly stuck in an open position away from the second flexible member 46.

Operation

Starting from a position wherein all of the wheels of the tractor 10 are on even ground, the operation will be described as the rear wheels drop into a depression. This action causes the chassis 14 to move downward along with the housing 18. This downward movement momentarily changes the force value holding the cab structure 12 in place and the weight of the cab structure 12 will push down on the stem 30 and the fitting 36. This downward force will compress the second flexible member 46 causing it to mushroom outward since it is being squeezed from above and is retained from below by the housing 18. As the flexible member 46 expands outward, the fluid 20 present in the passages 50 is forced upward at a sufficient pressure to lift the valve 54 away from its seat. The fluid 20, which is displaced into the cavity 52 by the deflection of the second flexible member 46 will cause the air permeable member 58 to compress.

The cab structure 12 is cushioned by the deformation of the flexible member 46 and by the restricted flow of the fluid 20 around the valve 54. Both actions damp the vibrations which would otherwise be imparted into the cab structure 12.

As the rear wheels of the tractor 10 roll up out of the depression, the second flexible member 46 exerts an upward force on the stem 30 as it tries to return to its original shape. Simultaneously, the fitting 36 is urged upward and compresses the first flexible member 44. With the upward movement of the second flexible member 46, the passages 50 are enlarged which causes the fluid 20 in the cavity 52 to be metered through the orifices 56. This flow rate, however, will be at a reduced rate as compared to the upward flow of the fluid 20 into the cavity 52 because the valve 54 will be seated in a down position due to the force of the higher pressure acting on its upper surface. This arrangement permits the wheels of the tractor 10 to move downward very rapidly while restricting their upward movement thereby cushioning the ride of the operator. Once the tractor 10 returns to level ground, the mounts 16 will return to their neutral position, as shown in FIG. 2.

It should be noted that lateral movement of the cab structure 12 relative to the chassis 14 will be damped by the horizontal movement of the flexible members 44 and 46. For example, as the second flexible member 46 is squeezed against the right surface of the housing 18, the fluid 20 in the passage 50, located on the right side of the mount 16, is pushed upward. Simultaneously, the passages 50, located on the left side of the mount 16, expand. This action causes a pressure drop across the valve 54 with the fluid 20 in the cavity 52 being at the higher pressure. As the fluid 20 is metered through the orifices 56, the lateral vibration to the cab structure 12 is damped.

Alternative Embodiment

Referring now to FIGS. 5-7, an alternative mount 116 is shown having a housing 118, preferably cup-shaped in configuration, which is capable of holding a quantity of fluid 120. The housing 118 contains a cover 122 which has an enlarged central opening 124 formed therein. The housing 118 and the cover 122 are securely attached to the chassis 14, for example, by bolts 126, washers 127 and nuts 128, one of each being shown in FIG. 5.

Positioned within the housing 118 is a fitting 130 which has a stem 131 formed on an upper end thereof and a through bore 132 formed therein. The through bore 132 is aligned with the opening 124 formed in the cover 122 and contains an inclined shoulder 134 which acts as a valve seat. The fitting 130 also contains several upper and lower radial passages 136 and 138, respectively, which extend outward from the through bore 132 to the outer periphery of the fitting 130 in a fashion similar to spokes on a wheel. The upper radial passages 136 are slanted downward from the outer peripheral surface of the fitting 130 toward the shoulder 134. The purpose of slanting the upper radial passages 136 downward will be explained shortly. The lower radial passages 138 each contains an orifice 140 which serves to restrict fluid flow therethrough. Preferably, the orifices 140 are located adjacent to the through bore 132.

Positioned within the through bore 132 is a valve 142 which seats against the inclined shoulder 134 when in a down position. The valve 142, which is preferably a poppet valve, is biased downwardly by a spring 144 which is retained in place by a set screw 146. The set screw 146 contains a socket head 148 which can receive a wrench engaging tool such that the set screw 146 can be threaded into the through bore 132 to adjust the tension on the spring 144. The set screw 146 also contains a downwardly projecting stem 150 which serves as a guide to the spring 144 to prevent the latter from buckling.

The valve 142 has a small diameter passageway 152 formed therein which permits fluid to flow through the valve 142 at all times. The valve 142 is movable between a seated position wherein fluid flow across the slanted seat 134 is prevented and a non-seated position wherein fluid flow across the slanted seat 134 is permitted.

The fitting 130 of the resilient mount 116 is attached at the stem 131 by a bolt 156 to a bracket 158, which in turn is attached to the cab structure 12. The bolt 156 is threaded into a threaded bore 157 formed in the fitting 130. It should be noted that the opening 124 formed in the cover 122 is larger than the outside diameter of the stem 131 to permit lateral movement of the fitting 130 relative to the housing 118.

The resilient mount 116 further includes first and second flexible members 160 and 162, respectively, positioned above and below the fitting 130. The flexible members 160 and 162, which preferably are constructed of an elastic type material like rubber, are tightly fitted into the housing 118 and cooperate to form a fluid cavity 164 therebetween. The fluid cavity 164 is arranged such that it will be in fluid communication with the upper radial passages 136. The purpose of having the upper radial passages 136 slanted downward from the cavity 164 enables the mount 116 to be tilted relative to its vertical position and still be able to provide hydraulic damping. It is virtually impossible to have an air pocket formed between the cavity 164 and the through bore 132.

The first flexible member 160 has a neck portion 168 which projects outward through the opening 124 in the cover 122. The neck portion 168 cushions the lateral movement of the fitting 130 and prevents physical contact of the fitting 130 with the cover 122. The second flexible member 162 has a plurality of chambers 170 formed therein which are aligned with the lower radial passages 138. In addition, the second flexible member 162 contains a passage 172 which is aligned with the through bore 132 and has a plurality of radial passages 174 formed on its lower surface. The radial passages 174 extend outward from the passage 172 to the outer periphery of the second flexible member 162.

The chambers 170 and the passages 172 and 174 are capable of varying in size as the second flexible member 162 is deflected by the motion of the fitting 130. As the chambers 170 and the passages 172 and 174 vary in size, the fluid 120 contained therein is forced to move across the valve 142 wherein it is metered to provide hydraulic damping.

The flexibility of the first and second flexible members 160 and 162 together with the damping effect of the fluid 120 passing across the valve 142 is especially useful in damping low frequency vibrations. In addition, the resilient mount 116 provides both lateral and vertical damping.

The operation of the resilient mount 116 is similar to that described above for the other embodiment and therefore should be apparent to those skilled in the art.

While the invention has been described in conjunction with two specific embodiments, it is to be understood that many alternatives, modifications, and variations will be apparent to those skilled in the art in light of the aforegoing description. Accordingly, this invention is intended to embrace all such alternatives, modifications, and variations which fall within the spirit and scope of the appended claims.

I claim:

1. A resilient mount for supporting a first member on a second member, said mount comprising:
   (a) a housing securely attached to said second member and having an opening formed in a top surface thereof, said housing containing a quantity of fluid;
   (b) a fitting positioned within said housing therein;
   (c) a stem securely attached at one end to said first member and at an opposite end to said fitting, said stem passing through said opening formed in said housing;
   (d) first and second flexible members tightly fitted into said housing above and below said fitting and forming a cavity therebetween, said first flexible member having an opening formed therein through which said stem passes and said second flexible member having at least one fluid passage formed therein communicating with said cavity; and
   (e) valve means for regulating fluid flow between said fluid passage and said cavity to provide damping of said first member relative to said second member.

2. A resilient mount for supporting a cab structure on a chassis of a vehicle, said mount comprising:
   (a) a housing securely attached to said chassis and having an opening formed in a top surface thereof, said housing containing a quantity of fluid;
   (b) a fitting positioned within said housing formed therein;
   (c) a stem securely attached at one end to said cab structure and at an opposite end to said fitting, said stem passing through said opening formed in said housing;
   (d) first and second flexible members tightly fitted into said housing above and below said fitting and forming a cavity therebetween, said first member having an opening formed therein through which said stem passes and said second member having fluid passages formed therein for conveying fluid thereacross; and
   (e) valve means for regulating fluid flow thereacross as said stem is moved relative to said housing to provide both lateral and vertical damping of said cab structure relative to said chassis.

3. The resilient mount of claim 2 wherein said valve means includes a vertically movable ring having a plurality of openings extending thereacross, some of said openings being aligned with said passages formed in said second flexible member.

4. The resilient mount of claim 2 wherein an air permeable member is positioned above said valve means and between said first and second flexible members, said air permeable member being capable of being compressed as said fluid is displaced due to the deflection of said flexible members.

5. The resilient mount of claim 4 wherein said air permeable member is a closed cell material.

6. The resilient mount of claim 4 wherein said air permeable member is an open cell material.

7. The resilient mount of claim 4 wherein said air permeable member is foam.

8. The resilient mount of claim 4 wherein a screen retains said air permeable member in place.

9. A resilient mount for supporting a cab structure on a chassis of a vehicle, said mount comprising:
 (a) a cup-shaped housing securely attached to said chassis and having an axially aligned opening formed in a top surface thereof, said housing containing a quantity of fluid;
 (b) a fitting positioned within said housing and having a threaded bore formed therein;
 (c) a stem securely attached at one end to said cab structure and threaded at an opposite end into said bore of said fitting, said stem passing through said opening formed in said housing;
 (d) first and second flexible members tightly fitted into said housing above and below said fitting and forming a cavity therebetween, said first member having an opening formed therein through which said stem passes and said second member having a plurality of fluid passages, said fluid passages formed about the periphery of said second member;
 (e) an air permeable member positioned in said cavity and retained away from said second flexible member, said air permeable member being capable of being compressed as said fluid is displaced due to movement of said stem relative to said housing; and
 (f) a valve positioned in said cavity below said air permeable member for regulating fluid flow thereacross as said stem moves relative to said housing to provide both lateral and vertical damping of said cab structure relative to said chassis.

10. The resilient mount of claim 9 wherein said valve is a movable ring having a plurality of openings extending across said valve, some of said openings being aligned with some of said passages formed in said second flexible member.

11. The resilient mount of claim 9 wherein said air permeable member is foam.

12. A resilient mount for supporting a cab structure on a chassis of a vehicle, said mount comprising:
 (a) a housing securely attached to said chassis and having an opening formed in a top surface thereof, said housing containing a quantity of fluid;
 (b) a fitting positioned within said housing having a through bore formed therein and radial passages which provide fluid communication between said through bore and the outer periphery of said fitting;
 (c) valve means for regulating fluid flow through said bore, said valve means having a small diameter passageway formed therein which provides constant fluid communication thereof;
 (d) a stem securely attached at one end to said cab structure and at an opposite end to said fitting, said stem passing through said opening formed in said housing; and
 (e) first and second flexible members tightly fitted into said housing above and below said fitting and forming a fluid cavity therebetween which communicates with said through bore via said radial passages, said first flexible member having an opening formed therein through which said stem passes and said second flexible member having an opening aligned with said through bore formed in said fitting, whereby movement of said stem relative to said housing causes said first and second flexible members to deflect and create fluid flow across said valve means and through said radial passages thereby providing damping of said cab structure relative to said chassis.

13. The resilient mount of claim 12 wherein said second flexible member has chambers formed therein which are aligned with some of said radial passages and which communicate with said through bore to permit fluid flow therebetween as said second flexible member is laterally deflected.

14. The resilient mount of claim 12 wherein there are a plurality of upper and lower radial passages.

15. The resilient mount of claim 14 wherein said upper radial passages are slanted downward away from said cavity toward said valve means to insure that said mount will function even when tilted from its vertical position.

16. The resilient mount of claim 14 wherein said upper and lower radial passages are circumferentially spaced equal distances apart.

17. The resilient mount of claim 12 wherein said valve means is a poppet valve.

18. The resilient mount of claim 17 wherein said poppet valve is biased to a seated position thereby restricting fluid flow across said valve.

19. A resilient mount for supporting a cab structure on a chassis of a vehicle, said mount comprising:
 (a) a housing securely attached to said chassis and having an opening formed in a top surface thereof, said housing containing a quantity of fluid;
 (b) a fitting positioned within said housing having an axially aligned through bore with a shoulder formed therein and vertically spaced apart radial passages which provide fluid communication between said through bore and the outer periphery of said fitting;
 (c) a valve positioned in said bore and seatable on said shoulder, said valve having a small diameter passageway formed therein which provides constant fluid communication therethrough, said valve further being movable between a seated position preventing fluid flow around said valve and a nonseated position permitting fluid flow around said valve;
 (d) a stem securely attached at one end to said cab structure and at an opposite end to said fitting, said stem passing through said opening formed in said housing; and
 (e) first and second flexible members tightly fitted into said housing above and below said fitting and forming a fluid cavity therebetween which communicates with said through bore via said upper radial passage, said first member having an opening formed therein through which said stem passes and said second member having chambers formed therein which are aligned with said lower radial passage and an opening axially aligned with said through bore formed in said fitting, whereby movement of said stem relative to said housing causes said first and second flexible members to deflect and create fluid flow across said valve and through said passages thereby providing both lateral and vertical damping of said cab structure relative to said chassis.

20. The resilient mount of claim 19 wherein there are a plurality of said upper and lower radial passages which are circumferentially spaced an equal distance apart.

21. The resilient mount of claim 19 wherein said upper radial passages are slanted downward from said fluid cavity toward said valve to insure that said mount will function even when tilted from its vertical position.

22. The resilient mount of claim 19 wherein said second flexible member has a plurality of radial passages formed in a lower surface thereof which vary in size as said second flexible member is compressed against said housing thereby creating movement of fluid through said valve which aids in damping vibrations between said cab structure and said chassis.

* * * * *

UNITED STATES PATENT AND TRADEMARK OFFICE
CERTIFICATE OF CORRECTION

PATENT NO. : 4,460,168
DATED : 17 July 1984
INVENTOR(S) : Richard D. Obadal

It is certified that error appears in the above-identified patent and that said Letters Patent is hereby corrected as shown below:

Column 6, line 29, delete "therein"; lines 49 and 50, delete "formed therein".

Signed and Sealed this

Twenty-fifth Day of December 1984

[SEAL]

Attest:

GERALD J. MOSSINGHOFF

Attesting Officer

Commissioner of Patents and Trademarks